（12) United States Patent
Banerjee et al.

(10) Patent No.: US 9,239,790 B1
(45) Date of Patent: Jan. 19, 2016

(54) TECHNIQUES FOR EVICTING CACHED FILES

(71) Applicant: Symantec Corporation, Mountain View, CA (US)

(72) Inventors: Anindya Banerjee, Pune (IN); Ryan R. Lefevre, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 108 days.

(21) Appl. No.: 14/107,627

(22) Filed: Dec. 16, 2013

(51) Int. Cl.
G06F 12/08 (2006.01)
G06F 12/12 (2006.01)

(52) U.S. Cl.
CPC .......... *G06F 12/0808* (2013.01); *G06F 12/122* (2013.01)

(58) Field of Classification Search
None
See application file for complete search history.

(56) References Cited

U.S. PATENT DOCUMENTS

| | | | | |
|---|---|---|---|---|
| 5,721,874 | A * | 2/1998 | Carnevale et al. | 711/171 |
| 6,425,057 | B1 * | 7/2002 | Cherkasova et al. | 711/134 |
| 2003/0004922 | A1 * | 1/2003 | Schmidt et al. | 707/1 |
| 2004/0143713 | A1 * | 7/2004 | Niles et al. | 711/162 |
| 2006/0259728 | A1 * | 11/2006 | Chandrasekaran et al. | 711/170 |
| 2014/0115261 | A1 * | 4/2014 | Maybee et al. | 711/136 |

* cited by examiner

*Primary Examiner* — Christian P Chace
*Assistant Examiner* — Jane Wei
(74) *Attorney, Agent, or Firm* — Wilmer Cutler Pickering Hale and Dorr LLP

(57) ABSTRACT

Techniques for evicting cached files may be realized as a method including: maintaining a file system cache storing selected files from a file storage; for files that are above a threshold size, selectively storing chunks of the files; for each file that is stored, associating an access bit and a size bit with that file; for each file that is stored selectively as file chunks, associating an access bitmap to the file having an access bit associated with each file chunk; when a file is accessed, setting the access bit associated with the file and file chunk to indicate recent access; at set intervals, periodically clearing the access bits to not indicate recent access; and carrying out a cache eviction process comprising evicting at least one file or file chunk associated with an access bit that does not indicate recent access.

12 Claims, 6 Drawing Sheets

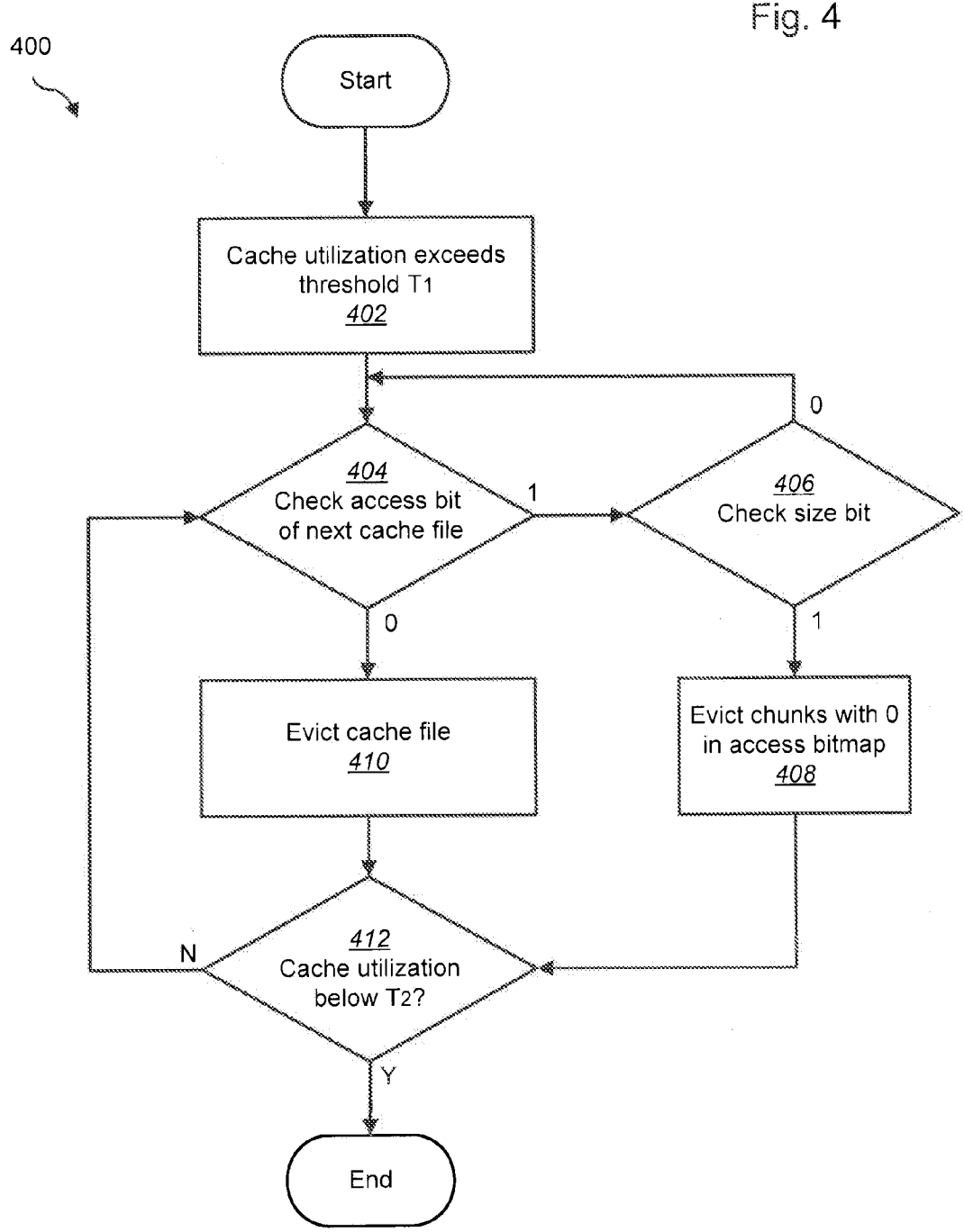

TECHNIQUES FOR EVICTING CACHED FILES

FIELD OF THE DISCLOSURE

The present disclosure relates generally to file caching and, more particularly, to techniques for evicting cached files.

BACKGROUND OF THE DISCLOSURE

Persistent devices, particularly solid state drives ("SSD"), provide a faster alternative to hard disk drives for storing data, but often come at a higher cost. One common use of a SSD is as a cache, wherein data that is needed immediately can be stored for quick access relative to a full storage medium.

However, where fast storage is used as a cache for a large file system, it becomes important to have an efficient process by which unneeded data can be evicted from the cache to make room for newer data. A variety of eviction algorithms for determining which cache files are the best candidates for removal from the cache are known in the art. Known eviction algorithms include LRU and L2ARC. These algorithms consume memory and processing time because ordered lists have to be maintained and updated with every access.

For example, one eviction technique is known as a "two-hand clock" algorithm. In this algorithm, each cache file is flagged whenever the file is used by the system. The system periodically sweeps the cache and turns off flags; files that are not flagged are eligible for eviction. This allows the system to preserve recently-used files in the cache while evicting files that have not been used since the most recent clock sweep. This algorithm may sometimes be less precise in choosing eviction candidates but requires significantly less memory and processing time than many other algorithms.

One potential problem with eviction algorithms, including the standard "two-hand clock" algorithm, is that large files may sometimes take up a significant portion of the cache even though only small portions of the files are actually accessed. To the extent that traditional algorithms evaluate access on a file basis only, this can result in an inefficient use of cache memory.

In view of the foregoing, it may be understood that there may be significant problems and shortcomings associated with current file system technologies.

SUMMARY OF THE DISCLOSURE

Techniques for evicting cache files are disclosed. In one particular embodiment, the techniques may be realized as a method comprising the steps of maintaining a file system cache associated with a file system, the file system cache storing selected files from a file storage; for files that are above a threshold size, selectively storing chunks of the files to the cache; for each file that is stored, associating an access bit and a size bit with that file, wherein the size bit indicates whether the file is stored selectively as file chunks; for each file that is stored selectively as file chunks, associating an access bitmap to the file, the access bitmap having an access bit associated with each file chunk; when a file is accessed, setting the access bit associated with the file to indicate recent access and, if the file is stored selectively as file chunks, setting the access bit associated with the accessed file chunk to indicate recent access; at set intervals, periodically clearing the access bits associated with the files and the access bits associated with the file chunks to not indicate recent access; and carrying out a cache eviction process comprising evicting at least one file or file chunk associated with an access bit that does not indicate recent access.

In accordance with other aspects of this particular embodiment, the cache eviction process may be initiated when a utilization level of the file system cache exceeds a first threshold. The cache eviction process may continue evicting files and file chunks with access bits that do not indicate recent access until the utilization level of the file system cache is below a second threshold. In accordance with further aspects of this particular embodiment, the second threshold may be less than the first threshold.

In accordance with further aspects of this particular embodiment, the method may further comprise carrying out the cache eviction process again. The second cache eviction process may begin at a point in the file system cache based on where the first cache eviction process finished.

In accordance with other aspects of this particular embodiment, the method may further comprise changing the size of the file chunks that are selectively stored in the file system cache in response to a change in the size of a file that is selectively stored as chunks. In accordance with further aspects of this particular embodiment, the size of the access bitmap associated with the file may not change when the size of the file chunks that are collectively stored is changed.

In accordance with further aspects of this particular embodiment, the method may further comprise, for each new file chunk of the file chunks following the change, identifying each of the file chunks from before the change that shared data with the new file chunk; determining if any of the identified file chunks from before the change were associated with an access bit indicating recent access; and setting the access bit associated with the new file chunk to indicate recent access only if at least one of the identified file chunks was associated with an access bit indicating recent access.

In accordance with other aspects of this particular embodiment, the techniques may be realized as at least one non-transitory processor readable storage medium storing a computer program of instructions configured to be readable by at least one processor for instructing the at least one processor to execute a computer process for performing the above-described method.

In accordance with another exemplary embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another exemplary embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 4 shows a method for cache file eviction in accordance with an embodiment of the present disclosure.

DETAILED DESCRIPTION OF EMBODIMENTS

Figure 1:
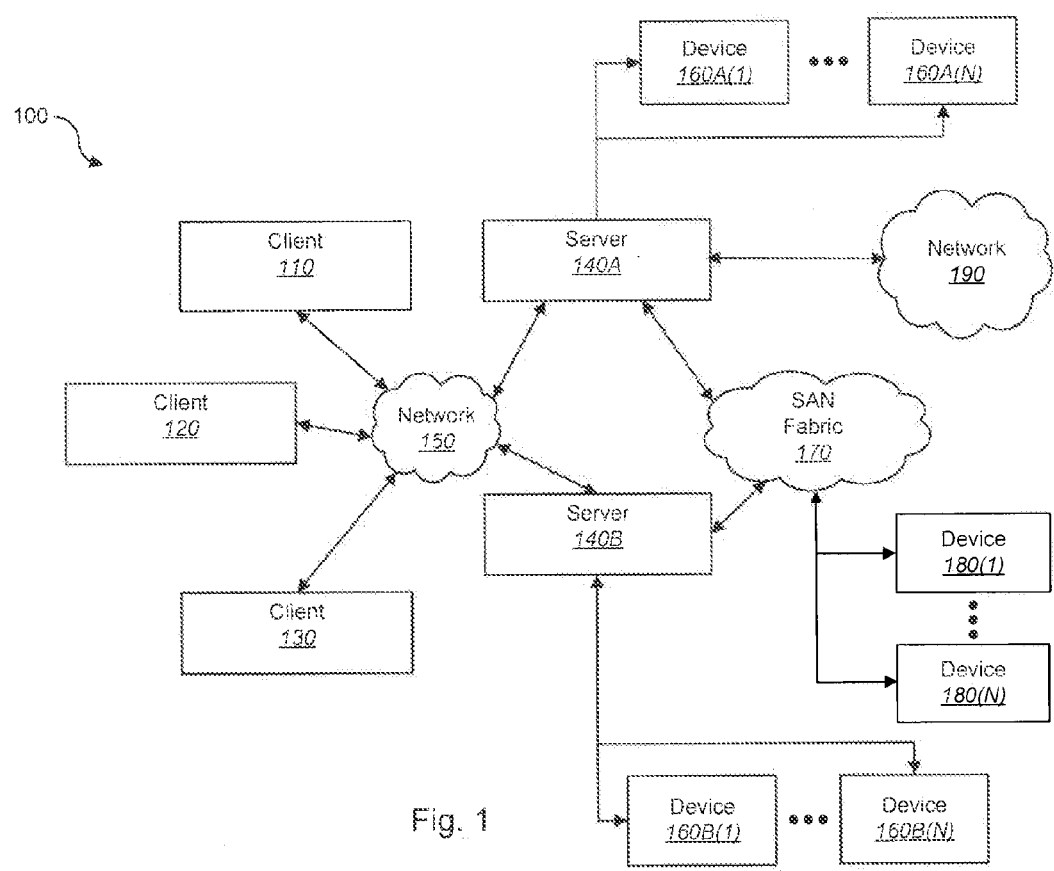
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
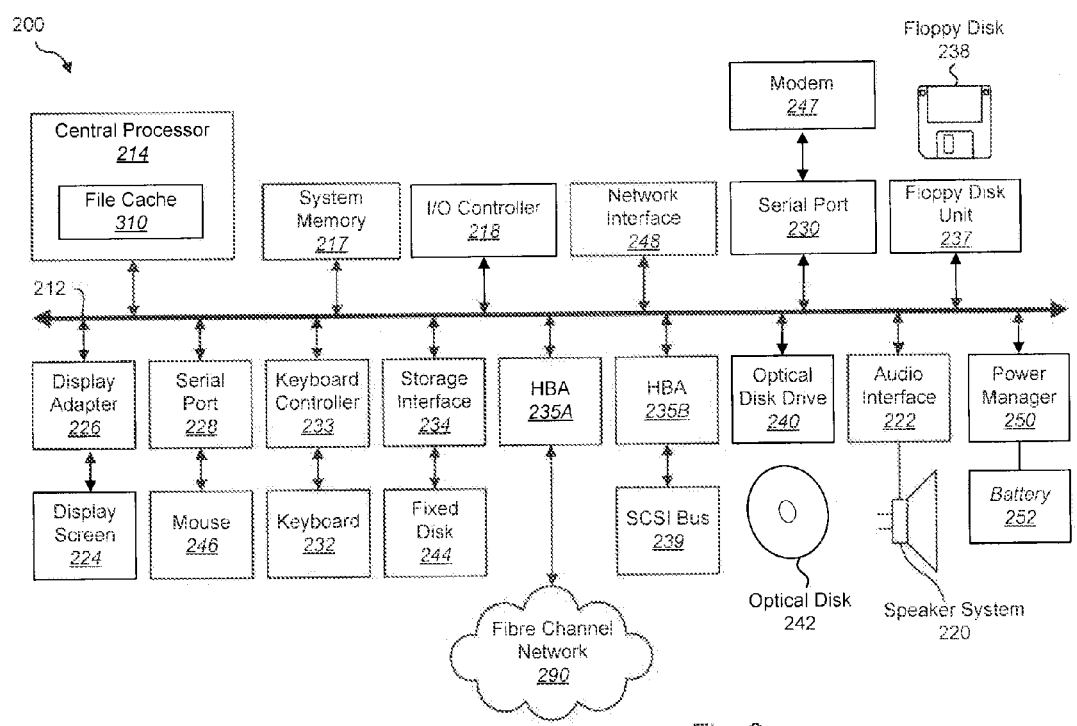
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, security management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

The central processor 214 includes a file cache 310 which uses a file system structure in order to store recently accessed files in cached memory. The file cache 310 is illustrated in FIGS. 3A and 3B.

Figure 3A:
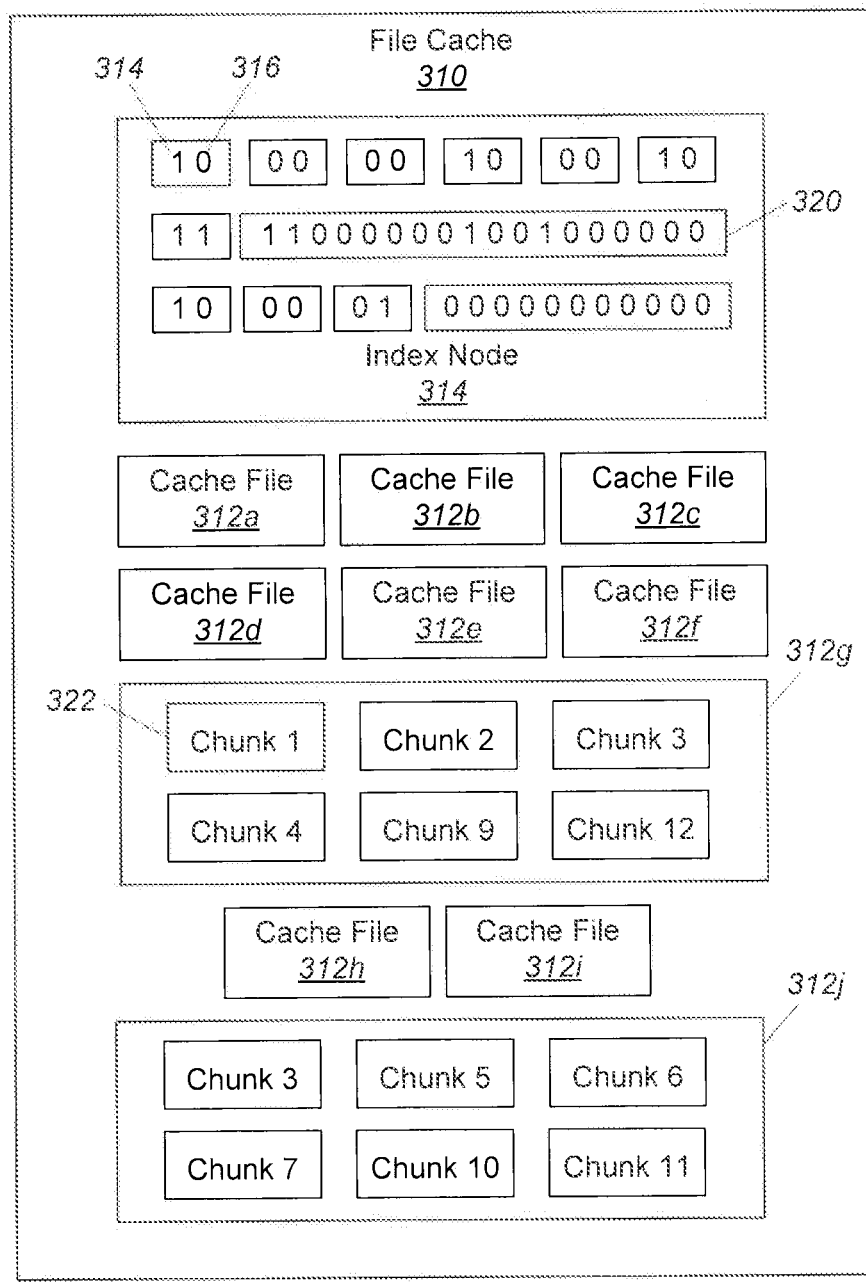
FIG. 3A illustrates a file cache with an index node in accordance with an embodiment of the present disclosure.
Figure 3B:
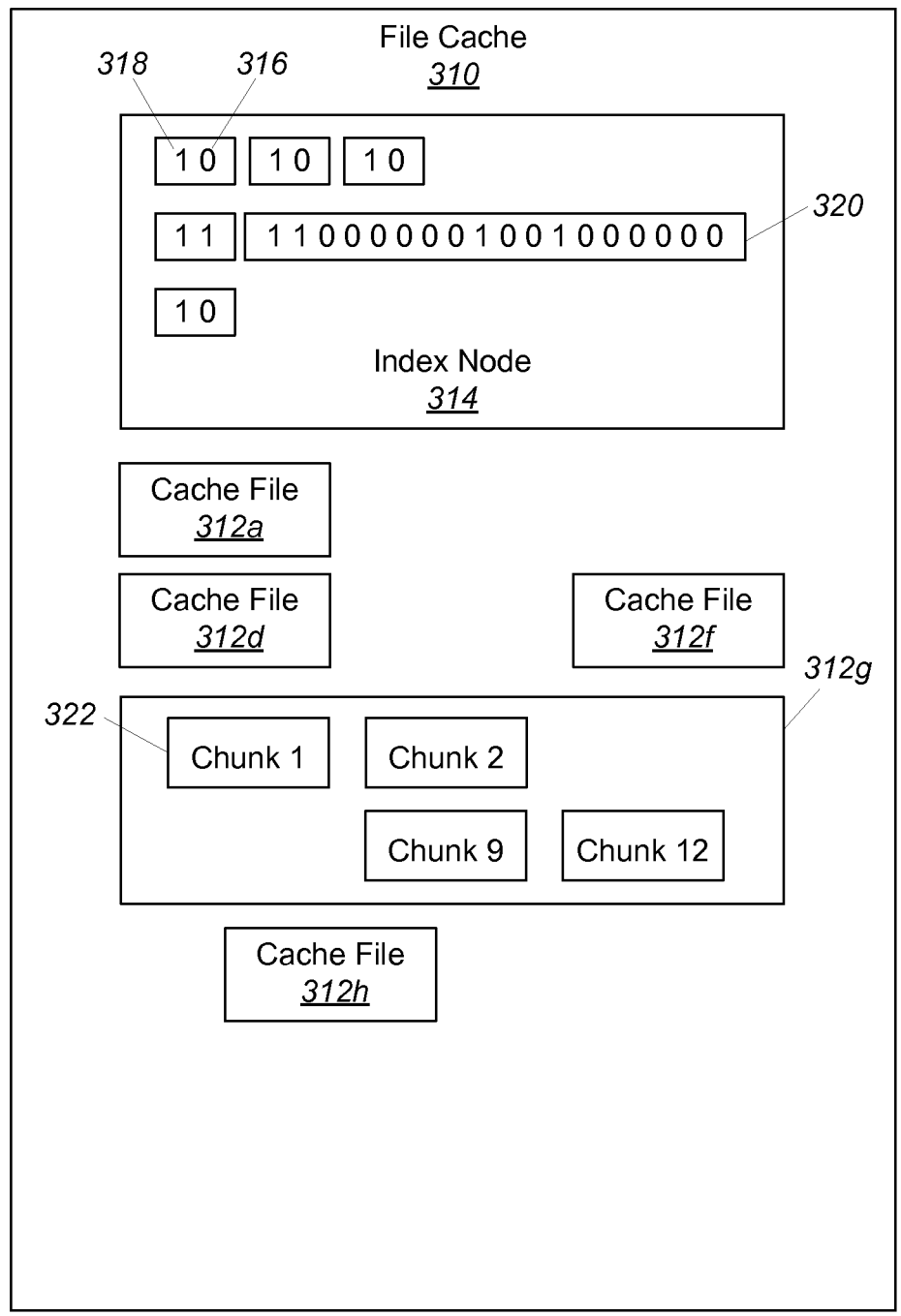
FIG. 3B illustrates a file cache shown in FIG. 3A after cache files have been evicted in accordance with the present disclosure.

As shown in FIG. 3A, the file cache 310 includes a plurality of cache files 312a-j and an index node 314 which includes information about the cache file system organizing the cache files 312a-j. Each cache file 312 corresponds to a file stored in the file system associated with system storage. However, reading and writing to and from the file cache 310 is quicker than reading and writing from the system storage. The system is therefore more efficient if recently-accessed files are kept in the limited space associated with the file cache 310 until files must be evicted to make way for new files in the cache 310.

The index node 314 maintains two bits 316, 318 for each file 312 currently stored in the cache 310: an access bit 316 and a size bit 318. The access bit 316 is set to 1 each time a file is accessed, and reset to 0 each time a clock sweep resets the access bits. This means that files 312 with access bits 316 set to 1 have been accessed since the most recent clock sweep; they are the more recently accessed files 312 in the cache 310. In the illustration of FIG. 3A, files 312a, 312d, 312f, 312g, and 312h have their corresponding access bits 316 in the index node 314 set to 1; they are the more recently accessed files 312.

In addition to the primary access bits 316, the system also includes an access record for segments of large files. The size bit 318 indicates whether a file is large enough to include the supplemental access records. Access for files with the size bit 318 set to 0 are considered as a whole by the eviction algorithm, while access for files with the size bit 318 set to 1 are also considered according to file chunks.

For files with the size bit 318 set to 1, the index node 314 also includes an access bitmap 320 which shows which file chunks 322 of a large file have been accessed. Each time a file chunk 322 is accessed, the associated access bit within the access bitmap 320 is set to 1, and the access bit 316 associated with the file 312 is also set to 1. When the clock sweep sets access bit 316 to 0, it also sets each bit in the access bitmaps 320 to 0. In the illustration of FIG. 3A, chunks 1, 2, 3, 4, 9, and 12 of file 312g are currently cached, and of those, chunks 1, 2, 9, and 12 have been accessed since the last clock sweep. None of the cached chunks of file 312j have been accessed since the last clock sweep, and so the access bit 316 for this file is set to 0.

FIG. 3B illustrates the result of an eviction process run on the file cache 310 as shown in FIG. 3A. Each of the files 312 with access bits 316 set to 0 are evicted, including small files 312b, 312c, 312e, and 312i along with large file 312j. Additionally, chunks associated with bitmap 320 access bits that are set to zero are also evicted, including chunks 3 and 4 from large file 312g. The access bits 316 and access bitmaps 320 form a simple and efficient method for determining which cache files can be evicted.

An example of an eviction algorithm is illustrated by the method 400 shown in the flowchart of FIG. 4. The eviction process may occur when the cache utilization exceeds a threshold value $T_1$ (step 402). In some implementations, the cache utilization may be calculated based on the total size of the cache as well as the amount of space currently taken up by the files in the cache. Where the cache is of a known and set size, the system may generally track cache utilization as the amount of space currently used by the files in the cache. The threshold value $T_1$ is in the same units as the cache utilization so that the two numbers can be easily compared. The threshold value $T_1$ may be selected taking into account both the minimum level of free cache space needed for efficient processing of the system and the amount of resources necessary to carry out cache eviction.

The system checks the access bit of the next cache file to see if the cache file has been used since the last clock sweep (step 404). In some implementations, the system keeps track of where within the cache the previous eviction algorithm stopped checking so that it can resume at the same place. This reduces the instance of very stale files or file chunks being missed by the eviction process and left in the cache.

When the access bit is set to 1, this indicates that the file has been accessed since the last clock sweep and should not be evicted. The system next checks the size bit (step 406) to see if the file is large and has a supplemental access bit map for each file chunk. If the size bit on the file is set to 0, then the system moves on to the next file.

If the size bit on the file is set to 1, then the system evaluates the access bitmap associated with the large file (step 408). Any chunk that is currently cached but has an access bit within the bitmap of 0 has not been accessed since the last clock sweep and can be evicted. Evicting file chunks may involve updating the file system to indicate which chunks of the file are still represented in the cache as well as re-structuring remaining file chunks to free up space made available by the evicted chunks.

Returning to the decision block 404, if the file has an access bit of 0, the file is evicted from the cache. The eviction process may involve writing any changes to the file since it has been cached to the corresponding stored file, eliminating the file's entry in the cache file system, and updating the index node to exclude the file. The cache space previously occupied by the cache file is now available for caching additional data from storage, which decreases the cache utilization.

After a cache file has been evicted or a large file consolidated, the system checks the cache utilization rate against a threshold value $T_2$. In some implementations, it may be appropriate for $T_2$ to be lower than $T_1$ such that once the system begins the eviction algorithm process, it will continue the process until a desirable level of free cache space is reached. Once cache utilization is reduced below the threshold $T_2$, the system ends the eviction process.

In some implementations, the clock sweep process wherein access bits are reset to 0 may occur at a set interval of time. For example, a clock sweep may occur about every five minutes or about every thirty minutes. The time interval between clock sweeps may depend on the level of activity of the system. In some implementations, the length of time between clock sweeps may be modified by the system based on monitored cache use in order to optimize system performance. In some implementations, the user may be able to choose a time interval for clock sweeps.

In some implementations, the access bitmap used for large files may be restricted to a certain size, for example to 32 bits. Accordingly, the size of the chunks may vary depending on the total size of the file.

When the length of a long file changes, the system may change how the file is segmented into chunks for cache purposes. In one implementation, the segmentation may change each time the file crosses a threshold that may represent doubling in size. For example, a cached file under 32 MB may be represented by 32 bits each representing 1 MB chunk. If the file increases in size past 32 MB (but still under 64 MB), the segmentation may change to represent 2 MB chunks. This may be done while preserving the access information already present for the cached chunks.

Figure 5:
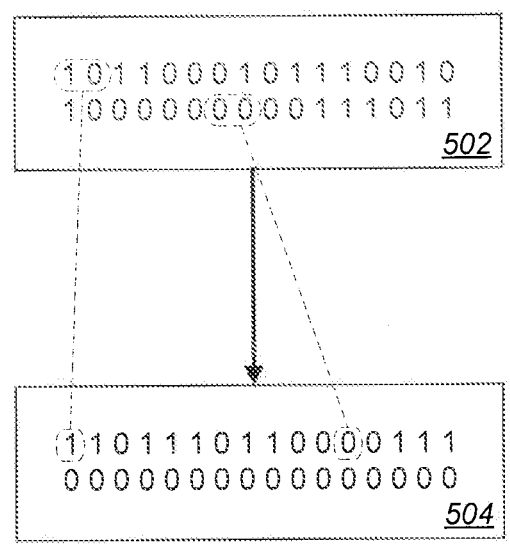
FIG. 5 illustrates a re-mapping of an access bitmap in accordance with an embodiment of the present disclosure.

FIG. 5 illustrates an example of a bitmap 502 in which each access bit represents a 1 MB chunk. The cached file increases in size past 32 MB, and in response the existing access bitmap 502 is re-mapped to 2 MB segments by mapping each pair of access bits in the old bitmap 502 to a new bitmap 504. The mapping uses an "OR" relationship, in that if either of the old access bits is 1, the new access bit is 1. Dotted lines on FIG. 5 illustrate two particular examples of the bit re-mapping. Bits representing the new, uncached file segments in the new bitmap 504 are entered as 0.

At this point it should be noted that techniques for evicting cached files in accordance with the present disclosure as described above may involve the processing of input data and the generation of output data to some extent. This input data processing and output data generation may be implemented in hardware or software. For example, specific electronic components may be employed in a file system management module or similar or related circuitry for implementing the functions associated with evicting cached files in accordance with the present disclosure as described above. Alternatively, one or more processors operating in accordance with instructions may implement the functions associated with evicting cached files in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
maintaining a file system cache associated with a file system, the file system cache storing selected files from a file storage;
for files that are above a threshold size, partitioning each such file into a plurality of file chunks, each file chunk representing a distinct portion of the file that is less than the whole file, and selectively storing fewer than all of the chunks of the partitioned file to the cache;
for each file that is stored, associating an access bit and a size bit with that file, wherein the size bit indicates whether the file is partitioned and stored selectively as file chunks;
for each file that is stored selectively as file chunks, associating an access bitmap to the file, the access bitmap having an access bit associated with each file chunk;
when a file is accessed, setting the access bit associated with the file to indicate recent access and, if the file is stored selectively as file chunks, setting the access bit associated with the accessed file chunk to indicate recent access;
at set intervals, periodically clearing the access bits associated with the files and the access bits associated with the file chunks to not indicate recent access;
carrying out a cache eviction process comprising evicting at least one file or file chunk associated with an access bit that does not indicate recent access; and
in response to a change in the size of a file that is selectively stored as chunks, changing the size of the file chunks that are selectively stored in the file system cache while maintaining the size of the access bitmap associated with the file, by, for each new file chunk of the file chunks following the change:
  identifying each of the file chunks from before the change that shared data with the new file chunk;
  determining if any of the identified file chunks from before the change were associated with an access bit indicating recent access; and
  setting the access bit associated with the new file chunk to indicate recent access only if at least one of the identified file chunks was associated with an access bit indicating recent access.

2. The method of claim 1, wherein the cache eviction process is initiated when a utilization level of the file system cache exceeds a first threshold, and wherein the cache eviction process continues evicting files and file chunks with access bits that do not indicate recent access until the utilization level of the file system cache is below a second threshold.

3. The method of claim 2, wherein the second threshold is less than the first threshold.

4. The method of claim 2, further comprising carrying out the cache eviction process again, wherein the second cache eviction process begins at a point in the file system cache based on where the first cache eviction process finished.

5. An article of manufacture comprising:
  at least one non-transitory processor readable storage medium; and
  instructions stored on the at least one non-transitory processor readable storage medium;
  wherein the instructions are configured to be readable from the at least one non-transitory processor readable storage medium by at least one processor and thereby cause the at least one processor to operate so as to:
    maintain a file system cache associated with a file system, the file system cache storing selected files from a file storage;
    for files that are above a threshold size, partition each such file into a plurality of file chunks, each file chunk representing a distinct portion of the file that is less than the whole file, and selectively store fewer than all of the chunks of the partitioned file to the cache;
    for each file that is stored, associate an access bit and a size bit with that file, wherein the size bit indicates whether the file is partitioned and stored selectively as file chunks;
    for each file that is stored selectively as file chunks, associate an access bitmap to the file, the access bitmap having an access bit associated with each file chunk;
    when a file is accessed, set the access bit associated with the file to indicate recent access and, if the file is stored selectively as file chunks, setting the access bit associated with the accessed file chunk to indicate recent access;
    at set intervals, periodically clear the access bits associated with the files and the access bits associated with the file chunks to not indicate recent access;
    carry out a cache eviction process comprising evicting at least one file or file chunk associated with an access bit that does not indicate recent access; and
    in response to a change in the size of a file that is selectively stored as chunks, change the size of the file chunks that are selectively stored in the file system cache while maintaining the size of the access bitmap associated with the file, by, for each new file chunk of the file chunks following the change:
      identifying each of the file chunks from before the change that shared data with the new file chunk;
      determining if any of the identified file chunks from before the change were associated with an access bit indicating recent access; and
      setting the access bit associated with the new file chunk to indicate recent access only if at least one of the identified file chunks was associated with an access bit indicating recent access.

6. The article of manufacture of claim 5, wherein the cache eviction process is initiated when a utilization level of the file system cache exceeds a first threshold, and wherein the cache eviction process continues evicting files and file chunks with access bits that do not indicate recent access until the utilization level of the file system cache is below a second threshold.

7. The article of manufacture of claim 6, wherein the second threshold is less than the first threshold.

8. The article of manufacture of claim 6, wherein the instructions are further configured to cause the at least one processor to operate so as to carry out the cache eviction process again, wherein the second cache eviction process begins at a point in the file system cache based on where the first cache eviction process finished.

9. A system comprising:
  one or more processors communicatively coupled to a network; wherein the one or more processors are configured to:
    maintain a file system cache associated with a file system, the file system cache storing selected files from a file storage;
    for files that are above a threshold size, partition each such file into a plurality of file chunks, each file chunk representing a distinct portion of the file that is less than the whole file, and selectively store fewer than all of the chunks of the partitioned file to the cache;
    for each file that is stored, associate an access bit and a size bit with that file, wherein the size bit indicates whether the file is partitioned and stored selectively as file chunks;
    for each file that is stored selectively as file chunks, associate an access bitmap to the file, the access bitmap having an access bit associated with each file chunk;
    when a file is accessed, set the access bit associated with the file to indicate recent access and, if the file is stored selectively as file chunks, setting the access bit associated with the accessed file chunk to indicate recent access;
    at set intervals, periodically clear the access bits associated with the files and the access bits associated with the file chunks to not indicate recent access;
    carry out a cache eviction process comprising evicting at least one file or file chunk associated with an access bit that does not indicate recent access; and
    in response to a change in the size of a file that is selectively stored as chunks, change the size of the file chunks that are selectively stored in the file system cache while maintaining the size of the access bitmap associated with the file, by, for each new file chunk of the file chunks following the change:
      identifying each of the file chunks from before the change that shared data with the new file chunk;
      determining if any of the identified file chunks from before the change were associated with an access bit indicating recent access; and
      setting the access bit associated with the new file chunk to indicate recent access only if at least one of the identified file chunks was associated with an access bit indicating recent access.

10. The system of claim 9, wherein the cache eviction process is initiated when a utilization level of the file system cache exceeds a first threshold, and wherein the cache eviction process continues evicting files and file chunks with access bits that do not indicate recent access until the utilization level of the file system cache is below a second threshold.

11. The system of claim 10, wherein the second threshold is less than the first threshold.

12. The system of claim 10, wherein the one or more processors are configured to operate so as to carry out the cache eviction process again, wherein the second cache eviction process begins at a point in the file system cache based on where the first cache eviction process finished.

* * * * *